US008515971B2

(12) United States Patent
Beaudet

(10) Patent No.: US 8,515,971 B2
(45) Date of Patent: Aug. 20, 2013

(54) METHOD FOR ASSISTING IN MAKING A DECISION ON BIOMETRIC DATA

(75) Inventor: Jean Beaudet, Pelussin (FR)

(73) Assignee: Thales, Neuilly sur Seine (FR)

( * ) Notice: Subject to any disclaimer, the term of this patent is extended or adjusted under 35 U.S.C. 154(b) by 1261 days.

(21) Appl. No.: 12/092,725

(22) PCT Filed: Nov. 2, 2006

(86) PCT No.: PCT/EP2006/068028
§ 371 (c)(1),
(2), (4) Date: Oct. 8, 2008

(87) PCT Pub. No.: WO2007/054458
PCT Pub. Date: May 18, 2007

(65) Prior Publication Data
US 2012/0109976 A1    May 3, 2012

(30) Foreign Application Priority Data

Nov. 8, 2005   (FR) ..................... 05 11353

(51) Int. Cl.
*G06F 17/30*       (2006.01)
(52) U.S. Cl.
USPC ............ 707/750; 707/802; 382/115; 382/118
(58) Field of Classification Search
USPC .......... 707/664, 692, 730, 758, 780, E17.041, 707/E17.096, 750, E17.084, 802; 382/115, 382/116, 118, 124, 126, 284
See application file for complete search history.

(56) References Cited

U.S. PATENT DOCUMENTS

| 4,424,589 | A | * | 1/1984 | Thomas et al. ............... 382/317 |
| 5,117,119 | A | * | 5/1992 | Schubert et al. .............. 356/443 |
| 5,187,538 | A | * | 2/1993 | Iwamoto et al. ............. 356/28.5 |
| 5,661,666 | A |   | 8/1997 | Pawlak |
| 5,920,024 | A | * | 7/1999 | Moore ............................ 356/29 |
| 6,023,522 | A | * | 2/2000 | Draganoff et al. ............ 382/124 |
| 6,401,132 | B1 | * | 6/2002 | Bellwood et al. ............. 709/246 |
| 6,725,303 | B1 | * | 4/2004 | Hoguta et al. ................ 710/106 |
| 6,920,231 | B1 | * | 7/2005 | Griffin .......................... 382/115 |

(Continued)

OTHER PUBLICATIONS

Peter Corcoran, and Alex Cucos—"Techniques for Securing Multimedia Content in Consumer Electronic Appliances using Biometric Signatures"—IEEE Transaction on Consumer Electronics, Mar. 30, 2005 vol. 51, issue 2 (pp. 545-551).*

(Continued)

*Primary Examiner* — John E Breene
*Assistant Examiner* — Anh Ly
(74) *Attorney, Agent, or Firm* — Lowe Hauptman Ham & Berner, LLP

(57) ABSTRACT

The present invention relates to a method for assisting a user in making a decision to compare biometric data of an individual with data from a database relating to a large number of individuals, and biometric data is acquired for an individual concerned, that this data is encoded, that the data items are compared in pairs with corresponding data from the database, that, for each comparison score the duplicate occurrence frequency/non-duplicate occurrence frequency ration is established, that the product of all the available ratios is calculated, that this product is standardized, that the standardized ratio is compared to a pre-set threshold, that the values greater than the pre-set threshold are kept and that this result is submitted to the user for him to validate it as appropriate.

9 Claims, 1 Drawing Sheet

(56) References Cited

U.S. PATENT DOCUMENTS

| | | | |
|---|---|---|---|
| 7,689,005 B2* | 3/2010 | Wang et al. | 382/115 |
| 7,792,332 B2* | 9/2010 | Griffin | 382/115 |
| 2003/0031348 A1 | 2/2003 | Kuepper et al. | |
| 2004/0071365 A1* | 4/2004 | Zhang et al. | 382/284 |
| 2004/0125993 A1* | 7/2004 | Zhao et al. | 382/124 |
| 2004/0170155 A1* | 9/2004 | Omar et al. | 370/349 |
| 2004/0193667 A1* | 9/2004 | Lehongre | 708/400 |
| 2004/0236573 A1* | 11/2004 | Sapeluk | 704/224 |
| 2005/0055312 A1* | 3/2005 | Wilson et al. | 705/51 |
| 2005/0084139 A1* | 4/2005 | Kyle | 382/115 |
| 2005/0157909 A1* | 7/2005 | Griffin | 382/115 |
| 2006/0041871 A1* | 2/2006 | Friedman et al. | 717/136 |
| 2006/0104485 A1* | 5/2006 | Miller et al. | 382/115 |
| 2006/0136734 A1* | 6/2006 | Telek et al. | 713/182 |

OTHER PUBLICATIONS

S. C. Ihde P. P. Maglio, J. Meyer, and R. Barrett—"Intermediary-based transcoding framework"—IBM Systems Journal—2001, vol. 40, issue 1, pp. 179-192).*

Prabhakar S et al: "Decision-Level Fusion in Fingerprint Verification": Pattern Recognition, Elsevier, Kidlington, GB, vol. 35, No. 4, Apr. 2002; pp. 861-874; XP004329459.

* cited by examiner

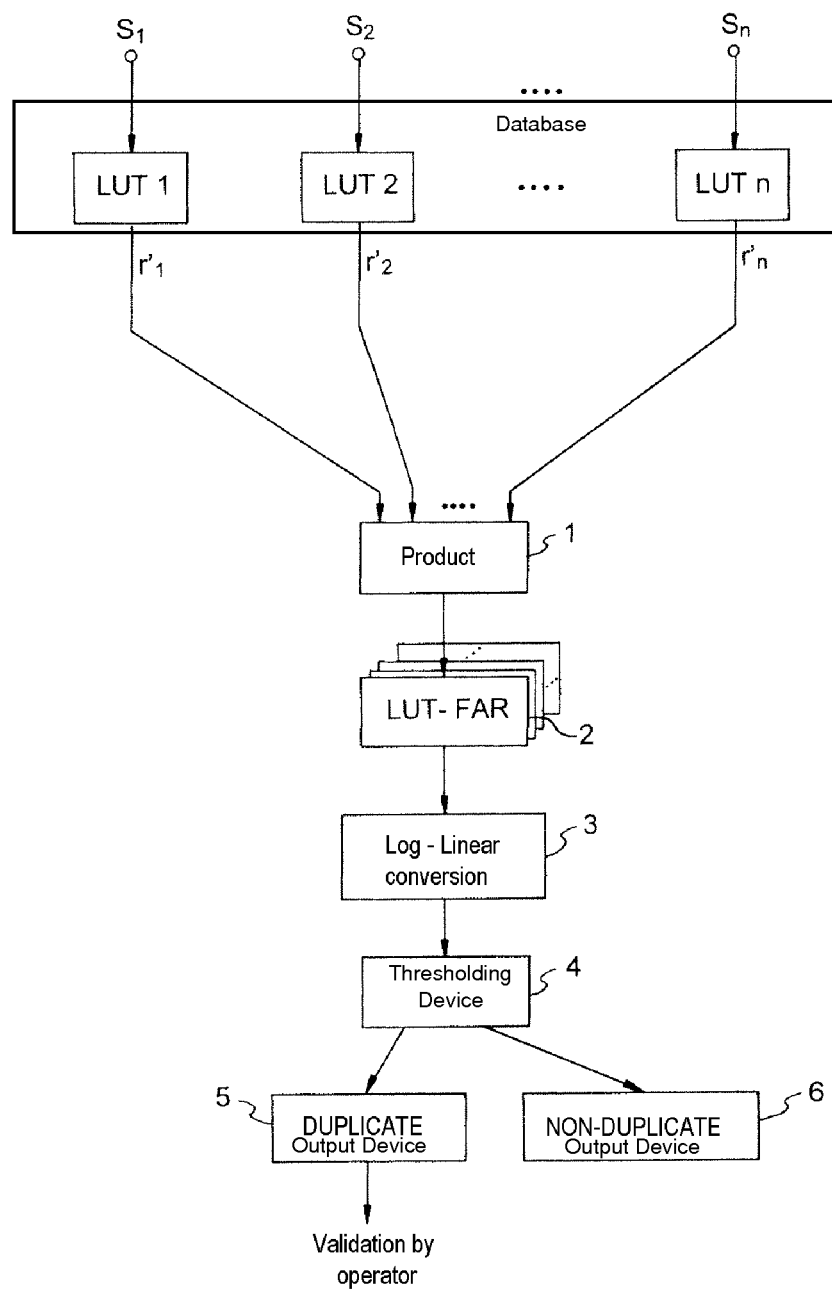

METHOD FOR ASSISTING IN MAKING A DECISION ON BIOMETRIC DATA

CROSS-REFERENCE TO RELATED APPLICATIONS

The present Application is based on International Application No. PCT/EP2006/068028, filed on Nov. 2, 2006, which in turn corresponds to French Application No. 05/11353 filed on Nov. 8, 2005, and priority is hereby claimed under 35 USC §119 based on these applications. Each of these applications are hereby incorporated by reference in their entirety into the present application.

FIELD OF THE INVENTION

The present invention relates to a method for assisting in making a decision to compare biometric data.

BACKGROUND OF THE INVENTION

To compare the biometric data relating to two individuals and determine whether they are the same person (the term "duplicate" then applying) or different people (non-duplicates), several digital data items can be available. These correspond, for example, to the comparison scores of each of their ten fingers. The present application is more particularly interested in the merging of the scores of these data items, in order to best make the duplicate/non-duplicate decision. The usual comparison performance measurements are error ratios, namely:
  The FAR (False Acceptance Rate), which is a "duplicate" classification rate for data concerning individuals who are in reality different,
  The FRR (False Rejection Rate) which is a "non-duplicate" classification rate for the data in fact belonging to one and the same individual.

When a large number of different comparison scores have to be processed, for example those relating to the ten fingers of an individual, in order for a single decision to be made, these scores are merged. In this case, the merging operator is effective if, for a given FAR, it minimizes the FRR (or conversely, if for a given FRR, it minimizes the FAR).

To perform the merge, the geometric mean m of the comparison scores of each of the ten fingers is calculated. Using a simple comparison of m with a threshold, the "duplicate" or "non-duplicate" decision is made. The threshold is determined by trial and error from measurements made on a sample of data. Such a known method does, however, have the following drawbacks:
  It deals badly with the case where certain digital data is not available (for example, because it is not possible to acquire the image of the prints of certain fingers).
  It is applied ineffectively to the scores supplied by certain comparison operators. For example, in the case of two operators, it imposes a hyperbola branch as the decision boundary, which does not always make it possible to obtain an optimum solution.
  It presupposes that the various comparison operators supply uniform scores, which is not, for example, the case if fingerprint scores are to be merged with facial recognition scores.

SUMMARY OF THE INVENTION

One object of the present invention is a method for assisting a user in making a decision to compare biometric data of an individual with data from a database relating to a large number of individuals, in order to reduce the number of cases in the database, a method making it possible to deal, with a more or less constant quality, with the cases where all the necessary data is available, like the cases where some of the data is missing, this method offering a decision boundary which can be adapted to the comparison operators that are to be merged, in order to obtain the best possible results (for example, an FRR that is as low as possible for a given FAR), this method also making it possible to merge non-uniform comparison scores.

The inventive method is a method for assisting a user in making a decision to compare biometric data of an individual with data from a database relating to a large number of individuals, and it is characterized in that biometric data is acquired for an individual concerned, that this data is encoded, that the data items are compared in pairs with corresponding data from the database, that, for each comparison score, the duplicate occurrence frequency/non-duplicate occurrence frequency ratio is established, that the product of all the available ratios is calculated, that this product is standardized, that the standardized ratio is compared to a pre-set threshold, that the values greater than the pre-set threshold are kept, and that this result is submitted to the user for him to validate it, as appropriate.

According to another characteristic of the invention, after thresholding, at least one other selection similar to the first is performed in cascade, with another set of scores obtained in other conditions for obtaining scores.

According to another characteristic of the invention, the threshold is determined by trial and error on samples from the database.

According to another characteristic of the invention, for n biometric data items to be compared, a set of $2^n$ transcoders is used to standardize the product of the available ratios, these transcoders being of the LUT type. Each of the $2^n$ LUTs is associated with one, and only one, of the $2^n$ possible subsets of the indices of the known scores.

According to another characteristic of the invention, the $2^n$ LUTs are initialized by performing measurements for only a limited number of them, namely those for which the subset of the indices of the known scores is the cardinal 2 or less, the others being calculated.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWING

The present invention is illustrated by way of example, and not by limitation, in the figures of the accompanying drawings, wherein elements having the same reference numeral designations represent like elements throughout and wherein:

DETAILED DESCRIPTION OF THE INVENTION

To implement the inventive method, a biometric database is first constructed from data acquired conventionally, then digitized and encoded. This database contains, for each of the individuals n biometric data items. Then, a large number of comparisons are performed (for example, several thousand to several hundred thousand) on these data items, on the one hand between non-duplicates and on the other hand between duplicates. The result of each comparison is a list s of n scores: s=(s1, s2, . . . , sn). ND denotes the non-duplicates class and D denotes the duplicates class. The observation probabilities $fD(s_i)=P(si/D)$ for the duplicates and $fND(si)=P(si/ND)$ for the non-duplicates are measured with a conventional method of estimating distributions, for example with a Gaussian core.

To merge the scores of these various data items, the overall problem of comparing n different biometric data items is broken down into $2^n$ sub-problems, according to the available scores (the fact that data from the n data items considered is available is not a bar to the implementation of the inventive method). Each of these sub-problems is identified by the subset $I \subset [1,2, \ldots n]$ of the indices i for which the scores are known.

For each of these sub-problems, the procedure is as follows. The following is defined:

$$r_I(s) = \prod_{i \in I} fD(s_i) / fND(s_i)$$

The classification operator simply performs a thresholding on this ratio $r_I(s)$. The following decision rule is deduced from it: the successive observations are classified as D if $r_I(s) >= R_I$ and as ND otherwise. However, rather than maintain $2^n$ thresholds $R_I$ (one for each possible subset I), it is preferable to convert $r_I$ to a value that can be used independently of I. For each sub-problem, a mapping table $r_I$->FAR is therefore established, according to the function: $x \mapsto P(rI \geq x)$. This value is the final score on which the D or ND decision will be made. This mapping is established as follows. Assuming that there is independence of the variables $s_i$, the relation can be calculated. It will be noted that the values $fD(s_i)$ and $fND(si)$ are sufficient to perform this calculation. Then, a readjustment is made if the assumption of independence is not statistically borne out as follows:
   if card(I)<=2 the relation is established by a measurement over a large number of comparisons,
   otherwise, for each of the sub-problems associated with the pairs of indices I'={i,j} included in I, the deviation is measured between the calculated relation and the measured relation. From the relation calculated for $r_I$->FAR on the one hand and from the average of these deviations on the other hand, the relation $r_i$->FAR is determined With reference to the single Figure of the drawing, there now follows a description of the process of merging data according to the present invention. To do this, it is assumed that there are n fingerprints (n=10 in this case) of an individual and/or other biometric data of this individual. For each of these prints, a "matching" is performed (comparison of the prints of the individual concerned with those in a database, for example a "Hough matching") and a comparison score is obtained each time. This score is, for example, an integer from the range [0,1000]. The various corresponding scores $S_i$ are denoted S1, S2, . . . . Sn at the top of the figure. These scores are each presented to the input of a converter, respectively LUT1, LUT2, . . . . LUTn. These converters are mapping tables stored in memories of the "Look-Up Table" type, and each supply, for each input score value, the ratio $r_i$ equal to $fD(s_i)/fND(s_i)$, as specified above.

Furthermore, according to a characteristic of the invention, the values of $r_i$ are calculated according to a base 10 logarithmic scale. Thus, a circuit 1, connected to the respective outputs of all the converters LUT1 to LUTn, presents at its output the product P of all the $r_i$, that is $P=(r_1 * r_2 * \ldots * r_n)$. This circuit 1 comprises a simple adder which calculates the sum of the logarithms of all the $r_i$.

The circuit 1 is followed by a set 2 of $2^n$ transcoders (for n biometric data items at the inputs S1 to Sn). These transcoders are also of the LUT type and they are responsible for transcoding P into a corresponding score value (also expressed in its base 10 logarithmic value), that is, as an FAR value. Furthermore, the transcoders of the set 2 perform an interpolation. This interpolation is a log 10 scale linear interpolation. It is necessary because the input values (the ratios rI) do not belong to a finite set (they are floating numbers).

The scores available at the output of the set 2 in logarithmic form are converted into linear values by a conversion circuit 3, then sent to a thresholding circuit 4. This circuit 4 compares the FAR calculated in this way by the circuits that precede it with a threshold that represents the real FAR of the set. This threshold is adjusted so that the error rate taken into account for the subsequent processing operations does not exceed an acceptable value (for example, for a human operator examining the output of the circuit 5, mentioned below, not to have too many checks to be performed). The circuit 4 comprises two outputs 5 and 6, respectively "duplicate" and "non-duplicate". A signal appears on the output 5 when the FAR value from the circuit 3 is less than the threshold of the circuit 4, and on the output 6 otherwise. It will be noted that, in the case where a signal appears on the output 5, a human operator carries out additional checks of conventional type to validate only the responses that are estimated to be good.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A computer-implemented method for assisting a user in making a decision to compare biometric data of an individual with data stored in a database relating to a large number of individuals, wherein the biometric data is acquired for an individual concerned, the biometric data is encoded, that the biometric data items are compared in pairs with corresponding data from the database, and wherein, for each comparison score, a duplicate occurrence frequency ratio and a non-duplicate occurrence frequency ratio are established, a product of all the duplicate occurrence frequency and non-duplicate occurrence frequency ratios is calculated, the product is standardized, using 2^n transcoders, where n is a number of compared biometric items, the standardized product is compared to a pre-set threshold, values greater than the pre-set threshold are kept, and the kept values are submitted to the user for validation.

2. The method as claimed in claim 1, wherein, after comparing the standardized product to the pre-set threshold, at least one other selection similar to the first is performed in cascade, with another set of scores obtained in other conditions for obtaining scores.

3. The method as claimed in claim 1, wherein the product of the duplicate occurrence frequency and non-duplicate occurrence frequency ratios is calculated by adding logarithms of the duplicate occurrence frequency and non-duplicate occurrence frequency ratios.

4. The method as claimed in claim 1, wherein the pre-set threshold is determined by trial and error on samples from the database.

5. The method as claimed in claim 1, wherein the transcoders are of a look-up table (LUT) type.

6. The method as claimed in claim 5, wherein each of the $2^n$ transcoders is associated with one, and only one, of the $2^n$ possible subsets of the indices of a known scores.

7. The method as claimed in claim 5, wherein the $2^n$ transcoders are initialized by performing measurements for only a limited number of the transcoders for which the subset of the indices of the known scores is cardinal 2 or less.

8. A system for assisting a user in making a decision to compare biometric data of an individual with data stored in a database relating to a large number of individuals comprising, at least one look-up table (LUT) for converting score values based on the biometric data into a duplicate occurrence frequency ratio and a non-duplicate occurrence frequency ratio, a first circuit for calculating a sum of logarithmic value of all the outputs of all the convert devices being linked to a multiplier device, a set of $2^n$ transcoders, where n is a number of compared biometric items, configured for standardizing a corresponding score value based on an output of the multiplier device, and a thresholding device with two outputs configured to output the corresponding score value.

9. The device as claimed in claim 8, wherein the converter devices are configured to supply logarithmic values, the multiplier device comprises an adder, and a logarithmic-linear conversion device is positioned between the set of transcoders and the thresholding device.

\* \* \* \* \*